(12) United States Patent
King

(10) Patent No.: US 9,700,175 B2
(45) Date of Patent: Jul. 11, 2017

(54) DISPENSER FOR PARTICULATE MATTER AND METHOD OF USE

(71) Applicant: Andrew Trafford King, Hamilton (NZ)

(72) Inventor: Andrew Trafford King, Hamilton (NZ)

(73) Assignee: Andrew Trafford King, Hamilton (NZ)

( * ) Notice: Subject to any disclaimer, the term of this patent is extended or adjusted under 35 U.S.C. 154(b) by 15 days.

(21) Appl. No.: 14/892,910

(22) PCT Filed: May 5, 2014

(86) PCT No.: PCT/NZ2014/000080
§ 371 (c)(1),
(2) Date: Nov. 20, 2015

(87) PCT Pub. No.: WO2014/189387
PCT Pub. Date: Nov. 27, 2014

(65) Prior Publication Data
US 2016/0088975 A1 Mar. 31, 2016

(30) Foreign Application Priority Data

May 22, 2013 (NZ) ........................................ 610904
Jan. 8, 2014 (NZ) ........................................ 619654

(51) Int. Cl.
| | |
|---|---|
| B65B 1/20 | (2006.01) |
| A47J 42/50 | (2006.01) |
| B65G 11/20 | (2006.01) |
| A47J 43/046 | (2006.01) |
| A47J 31/30 | (2006.01) |

(52) U.S. Cl.
CPC ............. *A47J 42/50* (2013.01); *B65G 11/206* (2013.01); *A47J 31/303* (2013.01); *A47J 43/046* (2013.01)

(58) Field of Classification Search
CPC .. G01F 11/24; G01F 11/00; A47F 1/03; A47F 1/02; A47J 42/50; B65G 11/20; B65G 11/206
See application file for complete search history.

(56) References Cited

U.S. PATENT DOCUMENTS

| | | | |
|---|---|---|---|
| 1,735,077 A | * | 11/1929 | Files ........................ G01F 11/24 222/224 |
| 4,560,092 A | | 12/1985 | Souza |
| 4,998,648 A | | 3/1991 | Contreras |
| 6,698,624 B2 | | 3/2004 | Ufheil et al. |
| 2011/0163131 A1 | | 7/2011 | Mih et al. |

* cited by examiner

*Primary Examiner* — Jason K Niesz
(74) *Attorney, Agent, or Firm* — Gable Gotwals

(57) ABSTRACT

This invention relates to a dispenser for dispensing particulate matter. The dispenser includes a hopper, a coupling configured for attachment of the hopper, either directly or indirectly, to a receptacle; an aperture configured to be moved between an open and closed position to allow or prevent, respectively, flow of the particulate matter between the hopper and the receptacle. The dispenser further includes a stirrer housed in the hopper and configured to move in a substantially vertical and rotational manner within the hopper.

18 Claims, 8 Drawing Sheets

DISPENSER FOR PARTICULATE MATTER AND METHOD OF USE

STATEMENT OF CORRESPONDING APPLICATIONS

This United States National Phase of PCT Application No. PCT/NZ2014/000080 filed 5 May 2014 claims priority to New Zealand Patent Application Nos. 610904 filed 22 May 2013 and 619654filed 8 Jan. 2014, the entire contents of which are incorporated herein by reference.

TECHNICAL FIELD

This invention relates to a dispenser for particulate matter and its method of use, and in particular, for dispensing coffee grounds.

BACKGROUND ART

Coffee is one of the most popular and widely consumed beverages in the world. The industry is reportedly worth in the tens of (US$) billions per year and it is the second most traded commodity after petroleum.

There are numerous ways to prepare coffee for drinking. A very popular option is to percolate ground roasted coffee beans, for instance using an Italian-style stove top coffee maker, also commonly known as the 'Moka pot' or 'Macchinetta'. For convenience, the term 'Moka pot' will be referred to throughout the remainder of the specification. Other types of percolators are also available, such as the 'Percolator Pot'.

The method of percolating coffee in a Moka pot relies on a two part stove-top device. It works by boiling water in a lower container to produce steam which increases pressure in this lower container. As a result, the water is driven through funnel-like filter into a central basket containing finely ground coffee. The water extracts the flavour and coffee oils in the ground coffee before being transferred (again through pressure) to an upper container ready for use.

In comparison, the Percolator Pot system does not use two containers, nor does it use pressure to force water through the coffee.

The percolation method, regardless of the type of device used, is widely used in Europe and South America and is growing in popularity in other countries. People enjoy the freshness of this coffee opposed to instant coffee made from freeze-dried or spray-dried alternatives. Percolated coffee also is popular because it retains the flavour more than filter coffee (also known as drip coffee). The filter coffee method, although convenient for making larger amounts of coffee, is disliked by many because of a loss of flavour and texture compared to the percolation method. This flavour loss is due primarily because the filter paper removes the natural oils present in coffee beans.

Despite the popularity of preparing coffee by the percolation method, there still remain some considerable difficulties and hindrances with the process.

Coffee beans contain natural oils, which tend to cause the ground coffee to have a sticky characteristic when the beans are heavily roasted and/or finely ground (as in the case of espresso coffees). Despite the oil being important for adding flavour to the coffee as noted above, the oil can cause significant problems when dispensing and preparing a coffee such as an espresso using a percolator method. These problems are highlighted further below.

This sticky characteristic can significantly add to the difficulty in evenly tamping the basket of a Moka pot and as a result can make handling/dispensing the ground coffee particularly inconvenient.

In order to address this problem, U.S. Pat. No. 4,998,648 describes a coffee dispenser used to fill a basket of a Moka pot. The concept in U.S. Pat. No. 4,998,648 relies on a cup-like device positioned in a hopper. The cup contains ground coffee which when flipped, dispenses the coffee into the basket positioned underneath. When the cup continues to rotate, the cup edge shaves off the top of the dispensed coffee, and the convex portion of the cup (the bottom) could help tamp the dispensed coffee as the cup is returned to the upwards facing position.

However, this dispenser concept will undoubtedly have problems in evenly tamping the coffee into the basket as one side of the basket will receive the majority of the dispensed coffee due to gravitational force during rotation. Furthermore, if the device in U.S. Pat. No. 4,998,648 were to be used with larger sized baskets, the cup will likely dispense the coffee just into the centre of the basket, and not evenly fill the basket.

A further problem resulting from the oily nature of ground coffee is that the coffee can get stuck to the walls of the hopper, if used. U.S. Pat. No. 4,998,648 does not provide any solution to effectively deal with this problem and its possible some of the ground coffee could also get stuck to the dispensing cup The ground coffee could also accumulate in the area under the cup between the aperture and the hopper wall.

A further problem with current percolation methods using Moka pots is that the ground coffee needs to be replaced each time a coffee is to be made. Typically this is done manually by the user filling up the central basket using a spoon before re-attaching the upper container. This can be a slow and messy process, and often the ground coffee is spilled. Not only is this a general inconvenience, but it also can lead to wasted coffee.

Also manual filling with a spoon does not look very chic or professional. As coffee is now considered to be a cultural/status symbol, this clumsy method of filling the basket of a Moka pot is a disadvantage to the percolation method.

Also, when filling the basket, it can be difficult to effectively pack (tamp) the ground coffee. Gentle and even tamping of the ground coffee is important to ensure a high quality coffee is produced. For instance, if there are areas of the basket where the ground coffee is not well tamped (or is uneven), the water will simply take the path of least resistance, and a weaker and/or potentially bitter flavoured coffee can result. Therefore, although it can be difficult to achieve, an objective with making high quality coffee is to have consistent density throughout the basket for even extraction and hence maximum flavour.

A further problem is over-pressurization, which can occur if the ground coffee is too densely tamped in the basket. This makes the tamping requirements quite different to a commercial espresso machine.

A lack of consistency can also result from these issues already mentioned, and in particular from a variance in tamping. This is a problem as users expect to be able to obtain a consistent strength and taste from one coffee to the next, regardless of whether making a coffee at home or purchasing at a café.

Currently, the percolation method using a Moka pot is most often used in the home setting. However, some of the problems discussed above including the oily nature of coffee, the inconsistency of flavour and quality, and the potential for mess make the process often inconvenient, too difficult or unenjoyable for many. If such problems are addressed, it will help to revitalize the popularity of the Moka pot in the existing home user markets. It may also make the Moka pot a more popular option for new and expanding markets such as throughout Asia if a user friendly way of dispensing coffee is found.

It should also be appreciated that many of the problems discussed above do not relate only to the percolation method using a Moka pot. For example, similar problems can exist with espresso machine Portafilters, or dispensers used with more sophisticated coffee grinder systems as often used in cafés or in the home setting.

On an even broader sense, many similar issues are often faced when dispensing a wide variety of particulate matter for a number of uses and applications.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to one aspect of the present invention there is provided a dispenser for dispensing particulate matter, the dispenser including:
a hopper;
a coupling configured to allow attachment of the hopper, either directly or indirectly, to a receptacle;
an aperture configured to be moved between an open and closed position to allow or prevent, respectively, flow of the particulate matter between the hopper and the receptacle;
characterised in
that the dispenser includes a stirrer housed in the hopper, and wherein the stirrer is configured to move in a substantially vertical and rotational manner within the hopper.

According to another aspect of the present invention there is provided a method of dispensing a particulate matter using the dispenser substantially described herein;
characterised in that the method includes the steps of:
a) adding an amount of particulate matter into the hopper whilst ensuring the aperture is in the closed position;
b) connecting the hopper and receptacle via the coupling;
c) ensuring the aperture is in the open position; and
d) moving the stirrer in the hopper in a substantially vertical and/or rotational manner within the hopper to aid transfer of the particulate matter from the hopper into the receptacle.

The present invention provides a convenient and consistent means and method for dispensing particulate matter such as ground coffee into a receptacle.

As will be outlined further within the specification, some major advantages of the dispenser and its use with coffee dispensing are that it:
a) accurately and gently tamps coffee and ensures even distribution in a receptacle in a consistent and reproducible manner;
b) avoids build up of particulate matter on the hopper walls;
c) avoids mess or unnecessary loss of coffee; and
d) is easy and quick to use, and is easily storable with coffee inside for convenient use later.

A further advantage of the invention is that the dispenser may be configured to be adaptable for various sizes and types of receptacles. This may be a particularly advantageous option for users who may need to quickly interchange between various sized receptacles. Although this is not essential to the invention, it is seen as a particularly commercially useful embodiment.

A further advantage is the aesthetic appearance of the dispenser especially whilst coffee is being pushed down through the hopper using the stirrer.

These and further advantages will become more apparent with the ensuing description.

DEFINITIONS AND PREFERRED EMBODIMENTS

Throughout this specification the term "particulate matter" should be taken as meaning any finely ground or small sized material (e.g. typically less than about 2-3 mm in diameter) which requires dispensation into a receptacle.

Preferably, the particulate matter is ground coffee beans. Ground coffee beans, also referred herein as coffee, will be referred to throughout the remainder of the specification for convenience; however, it should be considered that the present invention may be used with substantially any particulate matter.

Throughout this specification, the term "hopper" should be taken as meaning a container of any size or dimension which is configured to store, permanently or temporarily, a particulate matter destined to then be dispensed into a receptacle for subsequent use.

Preferably, the hopper is a cylindrically shaped flask with an open first end.

An open first end allows the hopper to be conveniently filled with coffee from the top and subsequently allow easy insertion of the stirrer into the hopper for use. Alternatively the stirrer may already be in position within the hopper before adding the coffee.

A cylindrical shaped hopper is preferred because:
a) it aligns with the circular shape of the receptacle; and
b) it would act synergistically with the spokes (see below) of the stirrer as it moved within the hopper.

Preferably, the hopper has a substantially closed second end and houses the aperture (discussed further below).

Preferably, the hopper is at least partially transparent.

Some advantages of this feature is that it may allow easy visual inspection of the coffee in the hopper (to determine when it needs refilling or cleaning), and also allows the user and onlookers to appreciate the visually aesthetic movement of coffee within the hopper when using the stirrer.

Throughout this specification, the term "receptacle" should be taken as meaning any container configured or able to receive a particulate matter. It should be clearly understood that the present invention is merely configured to engage with the receptacle, yet does not form an essential or necessary component of the actual invention. In this sense, it should be appreciated that the dispenser may be sold separately without the receptacle, yet be used subsequently with this receptacle.

It should be appreciated that the present invention may be used with many types of coffee makers, including the various types of percolator type devices. However, throughout the remainder of the specification, the description and examples will focus on use with a Moka pot style percolator. For instance, other types of receptacles which may be used are those seen in portafilters, capsules, pods and so forth.

More preferably, the receptacle is a conventional basket of a Moka pot. As discussed previously, the Moka pot is also known as "macchinetta".

In this embodiment, the receptacle is retained in place with a standard lower container of a Moka pot. This is convenient as once filled using the dispenser, the lower container and basket may then be easily handled by then fitting to an upper container of the Moka pot. The conventional percolator coffee making process for a Moka Pot may then continue after removal of the dispenser.

It should be appreciated that the present invention may be adapted to suit substantially any size of Moka pot. Typically, Moka pots have the same overall proportions and components, but are of different sizes depending on how much coffee is desired to be made in a single use.

Preferably, the dispenser is adaptable to different sized receptacles. The features and advantages of this will be discussed further below with reference to the coupling.

In an alternative embodiment, the dispenser is dedicated to a particular sized receptacle.

Although the inventor envisages the most applicable use will be with Moka pots for reasons outlined previously, various other types of coffee dispensers and/or receptacles may benefit from the same concept of the present invention where ground coffee is apportioned into a receptacle before use.

Beyond coffee, some food material examples include sugars, grains, drink powders and so forth. The inventor considers those food materials which have an oily or sticky characteristic will be particularly well suited to be used for the present invention.

Finally, the present invention may be used for a wide variety of other applications, such as measuring or dispensing low volume packaging of herbal remedies, or animal feed stuff Throughout the specification, the term "aperture" should be taken as meaning any passage, opening, channel or hole which allows particulate matter to pass from the hopper to the receptacle, and which includes an opened and closed position.

Preferably, the aperture is approximately the same size or slightly smaller to the circumference of the hopper and/or receptacle.

This may be particularly advantageous as it will allow the granules to more easily be transferred evenly and freely from the hopper into the receptacle. If the aperture is larger than the receptacle, it may cause the particulate matter to sit on the rim, or spill over the sides, of the receptacle.

The aperture is configured to be opened and closed. This feature allows the control of flow of the particulate matter from the hopper to the receptacle. There are many different embodiments by which the aperture may open and close.

Most preferably, the aperture is configured as part of a slider.

For example, the slider, when slid to a first position, may be aligned with the bottom portion of the hopper to provide an opening from the hopper through the aperture and into the receptacle. When slid to a second position, the slider may move to a closed position whereby the aperture does not align with the hopper's bottom portion. The inventor foresees use of "stoppers" at desired points on the slider to help limit movement between the fully closed or fully open position.

The slider may also be beneficial as the internal edging of the aperture, when slid, may help to cleanly shave the tamped coffee in the receptacle. This helps to ensure consistency and avoidance of mess once the hopper and receptacle are disengaged.

Preferably, the dispenser includes a spacer which is located between the slider and receptacle (e.g. basket).

The spacer may help to prevent the slider from rubbing against the receptacle. The spacer would include an aperture which is fixed and approximately matches the shape and size of the aperture of the slider. In this embodiment, the slider still shaves off the ground coffee on closing, but leaves the receptacle slightly full. Although the spacer is not required, the inventor sees the operation much smoother with it in position.

Preferably, the dispenser includes a base portion which in use is connected, or is able to be releasably connected to, to a bottom portion of the hopper.

In one embodiment, the aperture (e.g. slider) is configured as part of the base portion.

Throughout this specification, the term "coupling" should be taken as meaning any engagement means to allow the hopper and receptacle to connect, either directly or indirectly with one another.

In the embodiment wherein the dispenser includes a base portion, the coupling is present on the base portion to permit indirect connection between the hopper and receptacle via the coupling.

Preferably, the coupling is a concentric ring coupling.

For example, each ring may be configured to fit a different sized Moka pot lower container. In this way, the receptacle may simply "sit" inside the appropriate ring. This feature may allow the hopper to be easily positioned centrally over the receptacle.

Preferably, the dispenser includes a coupling adaptor.

The coupling adapter may enable the dispenser to couple to receptacles such as a Moka Pot or Portafilter which are smaller than the actual aperture/hopper size of the dispenser.

The adaptor may achieve this by fitting into the existing coupling. It may reduce the aperture size and provides a similar coupling method for smaller Mokas. For example, with a dispenser with concentric ring coupling for 3, 6 and 9 cup Moka pot, an adapter for 1 and 2 cup Moka pots may be fitted inside the 3 cup position (and also inside the aperture in the spacer if present).

The adapter may have an aperture diameter similar or slightly smaller than the 1 cup filter but this may also be adequate for the 2 cup filter. The adapter may have its own conical rings for the smaller Moka pots.

To illustrate its use, the adapter may simply be placed on top of the Moka pot, then the dispenser is placed on top of the adapter. Of course, many other methods or a combination of these may be used, including but not limited to:
- pressing or click fitting into the dispenser coupling;
- utilising an O-ring to hold adapter in the dispenser coupling (as with the hopper lid); and
- holding in place with magnets (e.g. a metal ring fitted on the adapter would be attracted to small magnets fitted into the base of the dispenser).

The aperture in the adapter will be smaller than the hopper diameter and the aperture in the slider (and spacer if fitted). Yet, it may still benefit from the vertical and rotational action of the stirrer assembly.

The stirrer may ensure that the coffee is mixed and passed to the filter and lightly pressed if desired. It may also still ensure that coffee does not stick inside the hopper. The slider mechanism will also provide the same benefit of levelling off the coffee.

The coupling with its adaptor may be used for other size combinations including additional sizes in the adapter if necessary.

Alternatively, a rotational screw-type action may be considered as an alternative coupling.

Alternatively, the coupling is a conical component made of a flexible or supple material. In this embodiment, the engagement may be provided simply via downward pressure of the conical component onto the receptacle.

For example a rubber mount may cover the upper lip of the receptacle to not only provide the coupling but also prevents ground coffee from sitting on the lip. The inventor sees this embodiment may be particularly well suited when the dispenser is used for differently sized receptacles. The base portion may include a circular medium to low density silicon rubber lip which is angled inwardly. This configuration of a rubber lip may allow frictional engagement with various sized bottom chambers of Moka pots.

Alternatively, the conical component may simply allow the dispenser to sit on the receptacle to keep the aperture centred.

With the conical version of the coupling system, a similar coupling adapter concept may be used which would reduce the aperture and have a smaller cone coupling for smaller Mokas. It may connect in a similar manner, either placed on the smaller Moka, then the dispenser placed on the adapter or alternatively the other options as discussed above.

Throughout this specification, the term "stirrer" should be taken as meaning any component which is configured to, or is able to, stir the particulate matter within the hopper of the present invention.

As will be outlined further below, the stirrer and its ability to move rotationally and vertically is highly advantageous because it helps to:
- evenly mix the ground coffee in the hopper, assist moving the coffee from the hopper to the receptacle and then evenly distribute and tamp the ground coffee evenly into the receptacle, which is a particular issue when the coffee is sticky and oily;
- break up clumps of ground coffee (again often due to its stickiness) in the hopper before being dispensed into the receptacle;
- help clear any ground coffee stuck to the walls of the hopper; and
- help to un-pack the partially compressed coffee in the hopper after each dispensation of the ground coffee into the receptacle.

All of these advantages are particularly useful when dealing with oily sticky coffee or other particulate matter, as often is the case with dark roasted and/or highly ground coffee beans (e.g. espressos). The rotational and vertical movement synergistically helps to achieve these results, which would not be achieved simply by just one or the other movement.

In particular, rotation alone is not sufficient to ensure the coffee will not stick to the walls but is very beneficial for unpacking the coffee to make it a consistent density in the hopper. Then when the ground coffee moves into the receptacle it is already close to the ideal density. The rotation with the stirrer lowered also ensures the coffee is evenly distributed right across the diameter of the receptacle. The vertical downward movement of the stirrer helps move the coffee in the hopper down into the receptacle. The vertical movement also advantageously aids in the unpacking and dispensation, and if necessary allows the very gentle packing in the receptacle.

The preferred features of the stirrer and its advantages are discussed further below.

Preferably, the dispenser (or hopper) includes a lid.

More preferably, the lid is integrally built onto a top portion of the stirrer.

The lid may be substantially any size or shape but preferably is configured to the same shape and dimension of the top portion of the hopper. Alternatively, the lid has slightly larger dimension than the hopper to allow the lid to be gripped by the user's fingers for easier removal.

Preferably, the lid includes a seal.

The seal may help to provide the lid to engage with the top portion of the hopper. In one embodiment, the lid is integrated on to the stirrer for convenience.

Preferably, the seal is an O-ring seal.

This helps make the lid easy to fit and remove, and provides an airtight seal. It also prevents the lid rotating or disengaging when the stirrer is rotated or lifted within the hopper.

Preferably, the stirrer includes an upper knob.

In one particularly preferred embodiment, a shaft of the stirrer extends through the lid and a knob is fitted to the end to allow one to easily manipulate the stirrer from outside the hopper. This may allow the stirrer to be rotationally and vertically moved by a user. This feature is advantageous as the lid may be retained in position while the stirrer manipulates the ground coffee within the hopper. This lid will help prevent any ground coffee escaping the hopper during this process.

Preferably, the stirrer includes a plurality of spokes extending from at least one elongate shaft. In this embodiment, the shaft is configured, in use, to extend the substantial length of the hopper when housed within. This helps the stirrer to manipulate the coffee throughout the hopper and importantly close to the receptacle where the coffee is to be packed. The spokes are advantageous as they may provide a small surface area/length ratio allowing it to travel through the ground coffee.

Preferably, the spokes radiate out from the at least one elongate shaft at a length which is configured to fit just within the confines of the hopper.

Most preferably, the spokes are configured to be a length whereby there is a very small gap (e.g. approximately 1 mm or less) to the walls of the hopper.

This allows removal of the majority of any coffee stuck to the hopper walls. It also avoids unnecessary friction which could otherwise make use of the dispenser difficult.

Alternatively, the spokes may be configured to lightly engage with the walls of the hopper.

In such an embodiment, the inventor envisages softer or flexible tips to avoid damaging the hopper walls. This may be beneficial as the spokes may lightly engage with the inner walls of the hopper to remove any coffee which has stuck to the walls. However, from preliminary trials, this need for the spokes to directly contact the hopper walls does not appear necessary to achieve the desired results.

Although many different embodiments are possible, the inventor foresees using a single centrally positioned elongate shaft with a plurality of spokes radiating outwards from it.

Preferably, the plurality of spokes are provided in pairs, wherein each pair radiates substantially horizontally outwards from the at least one elongate shaft at substantially opposing directions.

The inventor envisages the spokes being straight or slightly curved in the horizontal plane. The latter embodiment may be particularly beneficial for the lower spokes as this may help to assist movement of the ground coffee away from the wall of the hopper and through the aperture. This would be especially useful with a reduced aperture of an adapter.

The substantially horizontal orientation of the spokes is advantageous as it allows the uppermost spokes to make even contact with the lid to scrape off any ground coffee, and the lowermost spokes to provide even distribution and tamping within the receptacle.

Preferably, each pair of spokes is separated from the shaft by approximately 3-8 cm.

This distance is also preferred for the top pair of spokes to the lid. If the spacing is too close together, it can make the stirrer more difficult to operate. If the spacing is too far apart, the stirrer's ability to effectively mix and tamp the ground coffee may be hampered.

Most preferably, the pairs of spokes are separated by approximately 5 cm.

Preferably, a pair of spokes is positioned at the very end of the shaft.

This is very beneficial as it also helps to provide even distribution of ground coffee in the receptacle.

The inventor considers that it is preferred to not have any angle of offset between each pair, although this offset is a possible option. Having the pairs of spokes aligned may help make the stirrer easier to insert into the hopper filled with ground coffee, and may also allow for easier construction.

If there is an angle of offset between each pairs of spokes, this may be approximately between 1-10° between each pair. This feature may be advantageous to avoid the same portion of ground coffee being manipulated by the spokes if the stirrer is only being moved vertically within the hopper.

Preferably, the stirrer has between 6 and 30 spokes radiating from the at least one elongate shaft.

Again, with too few spokes, the stirrer may not achieve the desired results to the same level. With too many spokes, the inventor found no further advantage in effective mixing/dispensing yet the stirrer became more difficult to manipulate.

Also, additional spokes will add to the overall weight of the dispenser and cost of manufacture.

Preferably, the stirrer has approximately 10 spokes radiating from the at least one elongate shaft.'

Use of the Dispenser as Part of a Coffee Grinder

The dispenser, including the hopper, stirrer, and slider mechanism may be used as part of a coffee grinder.

In such an embodiment, there may be an aperture on the side of the hopper near the top for the freshly ground coffee to enter. It may be used with coffee makers such as the Moka or with a standard espresso machine filter handle (Portafilter). In the latter case, an additional rest assembly may enable accurate and rapid location of the filter handle under the dispenser aperture and one version of this could automatically open a modified slider assembly.

Also in this embodiment, the dispenser provides the added advantage that the grinder may be used as a Doserless Grinder (Doserless Grinders are increasingly popular as coffee is fresh ground for every cup) or as a more conventional Doser Grinder (especially when demand is high in a busy café and the ground coffee does not have time to oxidise noticeably).

For example, Doserless mode would simply require leaving the slider in the aperture open position and placing the Portafilter underneath before the grinder is started and stopping the grinder when the Portafilter is full. The stirrer may still be operated to distribute the coffee evenly in the filter and slider may still be closed to level off the coffee evenly if desired.

This could be incorporated as part of a new grinder design.

Alternatively, it may be sold as a retrofit kit for existing grinders in common use. As a retrofit, brands such as Anfim or Mazzer (models like the Mini-Mazzer) are very common and their designs do not change radically making them ideal candidates. It would simply mean unbolting the factory supplied dispenser (doser) section and bolting on the replacement dispenser kit. The dispenser kit may include adaptors and mounting brackets as required per model.

Outline of Advantages of the Present Invention

The dispenser allows rapid, convenient, and consistent filling of the receptacle.

The dispenser avoids mess—the hopper is easily filled, and once completed, the dispenser may be used repetitively to load numerous receptacles without the need to refill the hopper.

The dispenser may be filled through a top portion of the hopper or alternatively through the aperture. Advantageously, top filling also permits topping up at any stage, such that the oldest coffee stays closer to the bottom of the hopper to be used first.

The stirrer, its configuration and use allows a synergistic interaction with the hopper and receptacle to ensure the coffee is evenly distributed within the receptacle (better quality control).

The stirrer is particularly well suited to address issues encountered with oily sticky coffee, and particular to help ensure even tamping, and breaking up clumps and coffee stuck to the walls of the hopper and so forth.

By lifting, rotating and lowering the stirrer within the hopper once the receptacle is full, the stirrer helps to gently and evenly pack (tamp) the coffee. Consistent density is one of the keys to good coffee.

The stirrer also helps to unpack the un-dispensed ground coffee in the hopper for subsequent use. This can be a problem particularly when dealing with oily coffee (e.g. often the case with espresso coffee). In other words, it helps to maintain a consistent density in the hopper which then helps maintain a consistent density when transferred to the receptacle.

Once the receptacle is filled and packed, the closable aperture may be closed in a manner to effectively and consistently level off the granules in the receptacle. This ensures consistency and avoids overfilling of the receptacle.

Using the stirrer, the granules in the hopper may be quickly and easily lowered down into the receptacle, and any coffee granules may be easily removed from walls of the hopper.

The stirrer is easy to manipulate within the hopper with little effort.

The stirrer may be easily removed from the hopper to allow convenient filling and cleaning.

The dispenser may be configured to be adaptable to engage with many differently sized and shaped receptacles. Alternatively, the dispenser may be manufactured to engage with a specific size of receptacle.

The preferred aperture (slider) may be removed easily for cleaning.

The movement of the stirrer within the hopper can lead to a pleasing aesthetic movement (best described as a wave) of the granules as they are gently packed into the receptacle.

The hopper, lid and slider provides essentially an airtight storage of ground coffee.

The dispenser could be used to quickly and cleanly fill a commercial style espresso machine filter handle (Portafilter) before tamping.

The use of the dispenser or multiple dispenser(s) may be used for filling capsules or pods with coffee or blends of user's choice.

Provides user a variation in density control. Even though manufacturers of Moka Pots advise against tamping the filter, not all coffees are equal and some variation is required.

Still provides the user with the ability to spoon a little of a different coffee into the filter and then top up and level with the dispenser to provide a one off blend. e.g. part dark, part aromatic or part decaffeinated.

Interchangeable label bands or others label types could be placed on the hopper, top or base to show the user what coffee is in the dispenser.

As a Grinder Dispenser it has the dual advantage or Doserless Grinder or Doser Grinder modes of operation.

BRIEF DESCRIPTION OF THE DRAWINGS

Further aspects of the present invention will become apparent from the following description which is given by way of example only and with reference to the accompanying drawings in which:

FIG. 4A Top view of the slider according to a further aspect of the present invention.

BEST MODES FOR CARRYING OUT THE INVENTION

As depicted in FIGS. 1, 2, 5 and 6, the dispenser is shown generally as (1).

Figure 1:
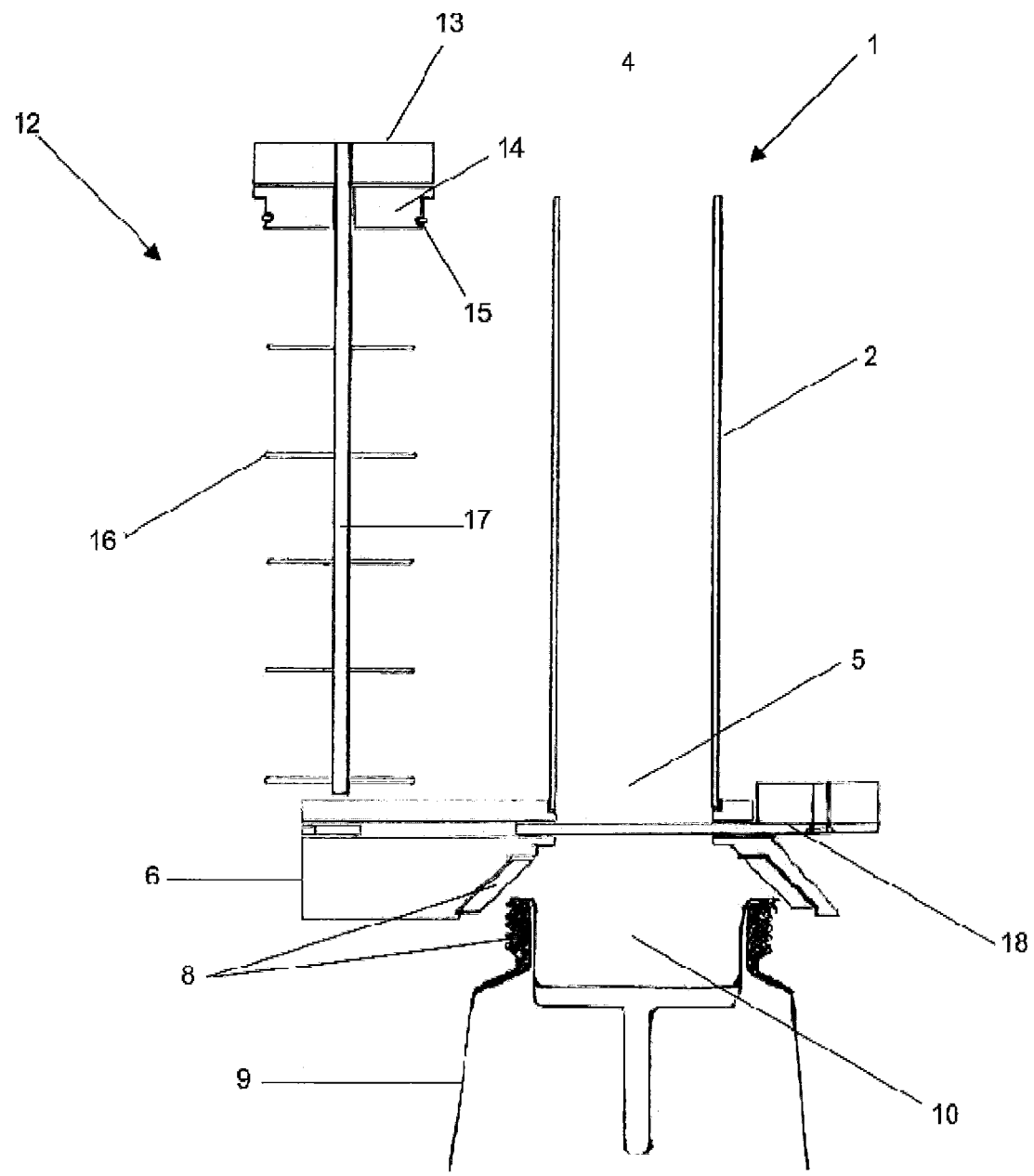
FIG. 1 Cross-sectional view of the dispenser according to one aspect of the present invention.
Figure 2:
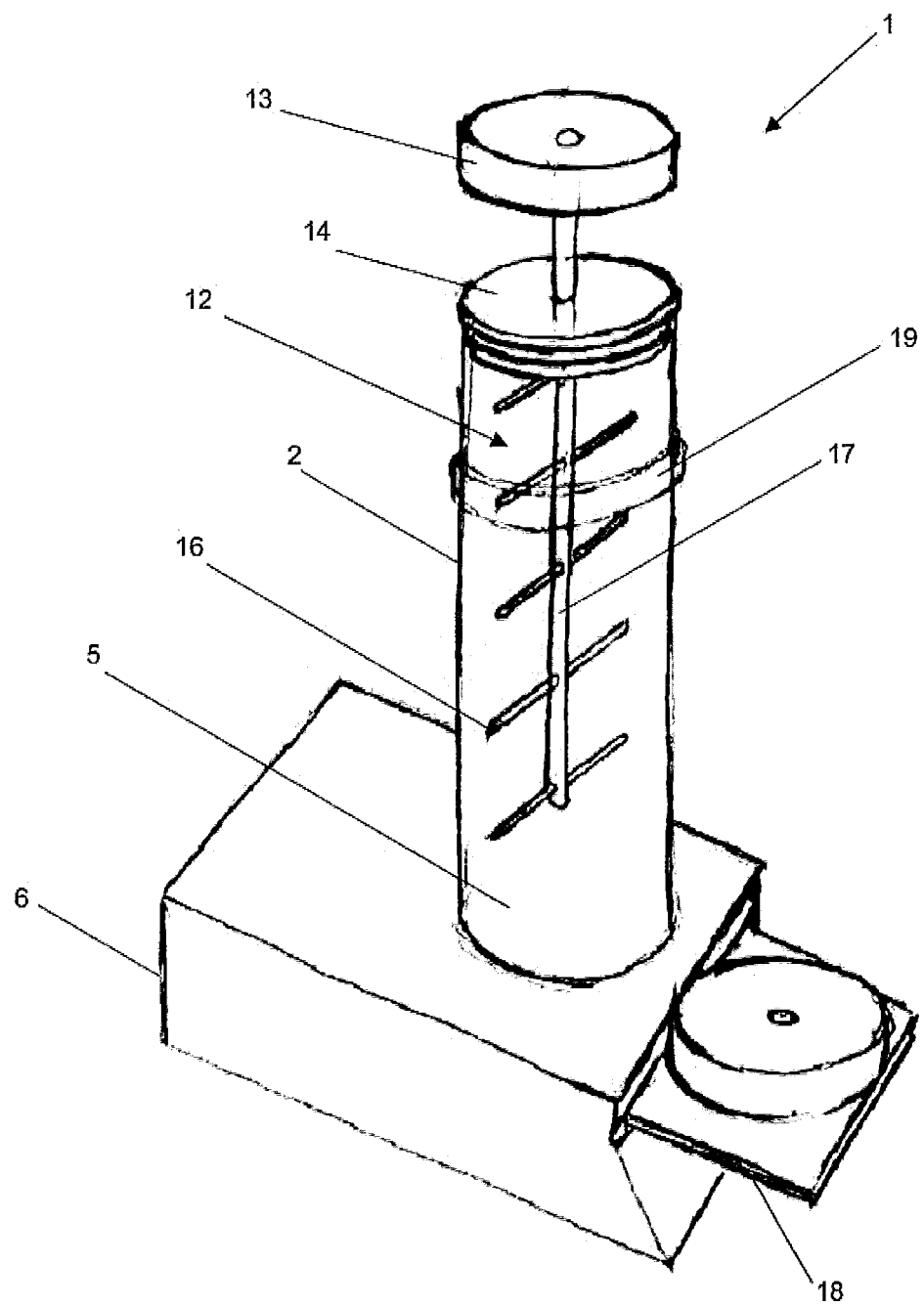
FIG. 2 Perspective view of the dispenser according to a further aspect of the present invention, and FIG. 3A Cross-sectional view of the coupling of the dispenser according to a further aspect of the present invention (lower container not shown as cross-sectional view).

As best shown in FIGS. 1 and 2, the dispenser includes a hopper (2) configured to store a particulate matter, in the most preferred case as ground coffee (not shown). The hopper (2) is cylindrical in shape and is approximately 25 cm in height, and 6 cm in diameter. The hopper (2) has an interchangeable band (19) to indicate the coffee type. The walls of the hopper (2) are transparent to allow visualisation of the ground coffee within.

The hopper (2) has an open first end (4) and a substantially closed second end (5). The closed second end (5) is formed by a base portion (6) which includes a slider (18). The slider (18) has fixed stoppers on one end that stop against the guides in the base portion (6). On the other end, part of the removable knob assembly acts as a stopper against the base portion (6).

Figure 4A:
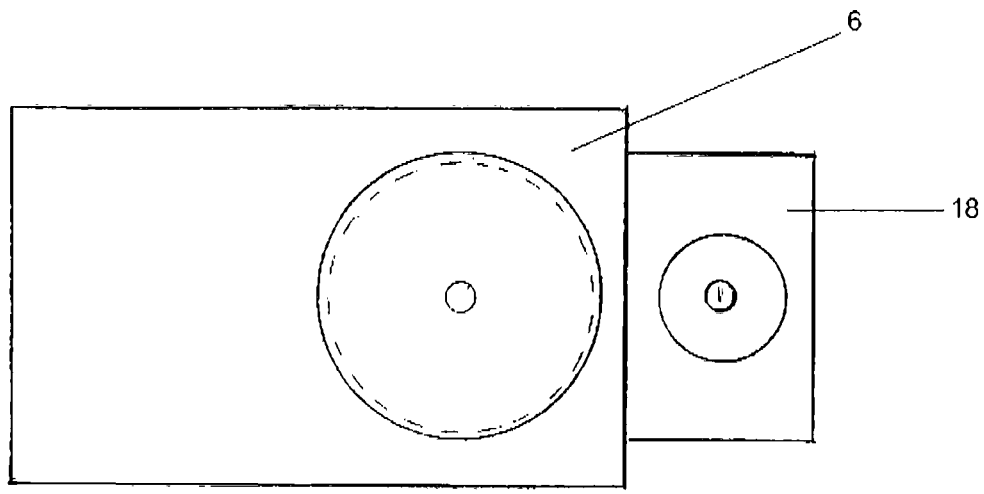
Figure 4B:
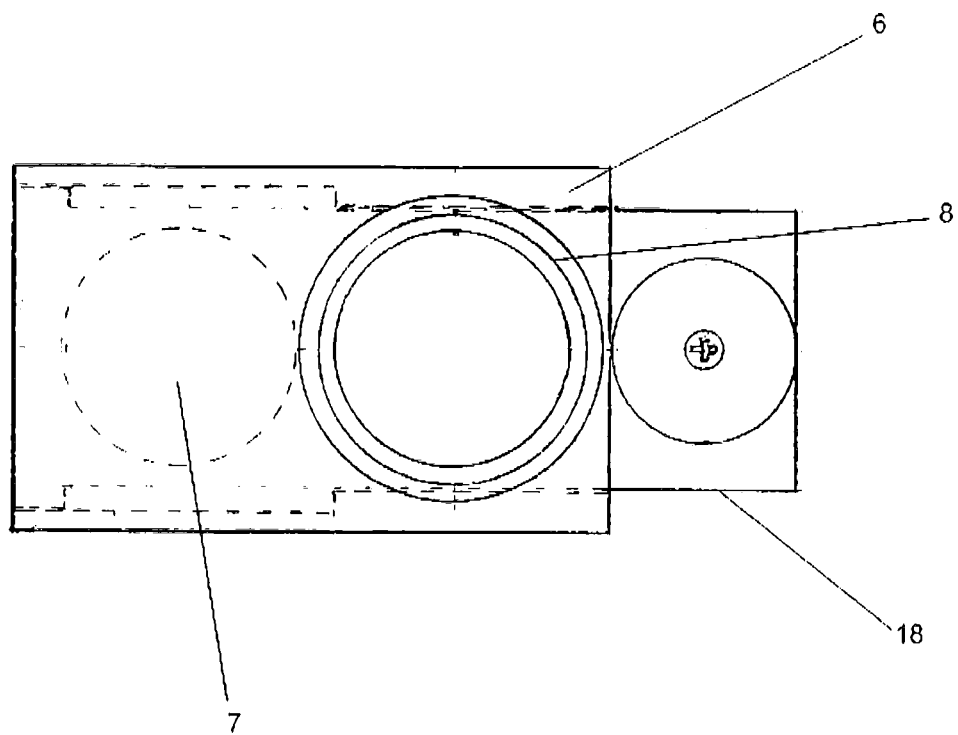
FIG. 4B Bottom view of the slider according to a further aspect of the present invention (detail of slider and guides shown in dotted outline).

In FIG. 4B, the slider (18) is shown to include an aperture (7) which, when slid, is able to align with the second end (5) of the hopper (2) to provide a channel for the ground coffee to pass through. When the slider (18) is moved to a further position, the aperture (7) does not align with the second end (5) of the hopper (2) and therefore the flow of ground coffee is blocked.

The dispenser (1) is configured to engage with a receptacle, in this case a lower container (9) of a Moka pot. Residing inside a conventional lower container (9) of Moka pot is a filter basket (10) which is configured to retain the ground coffee.

Figure 3A:
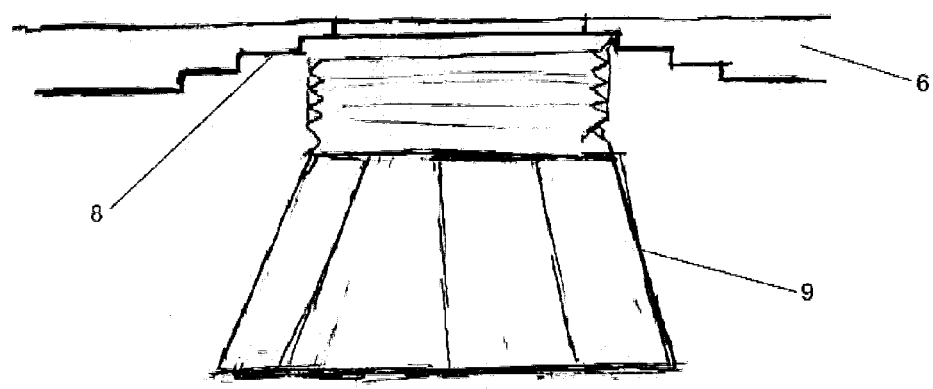
FIG. 3B Cross-sectional view of the coupling of the dispenser according to an alternative aspect of the present invention.

The ability to engage the dispenser (1) to the lower container (9) is through a coupling (8) between the base portion (6) and the lower container (9). In one embodiment shown in FIG. 3A, the coupling relies on concentric ring coupling between both the lower container (9) and base portion (6). In this embodiment, each ring is configured to fit a different sized Moka pot lower container (9).

Figure 7:
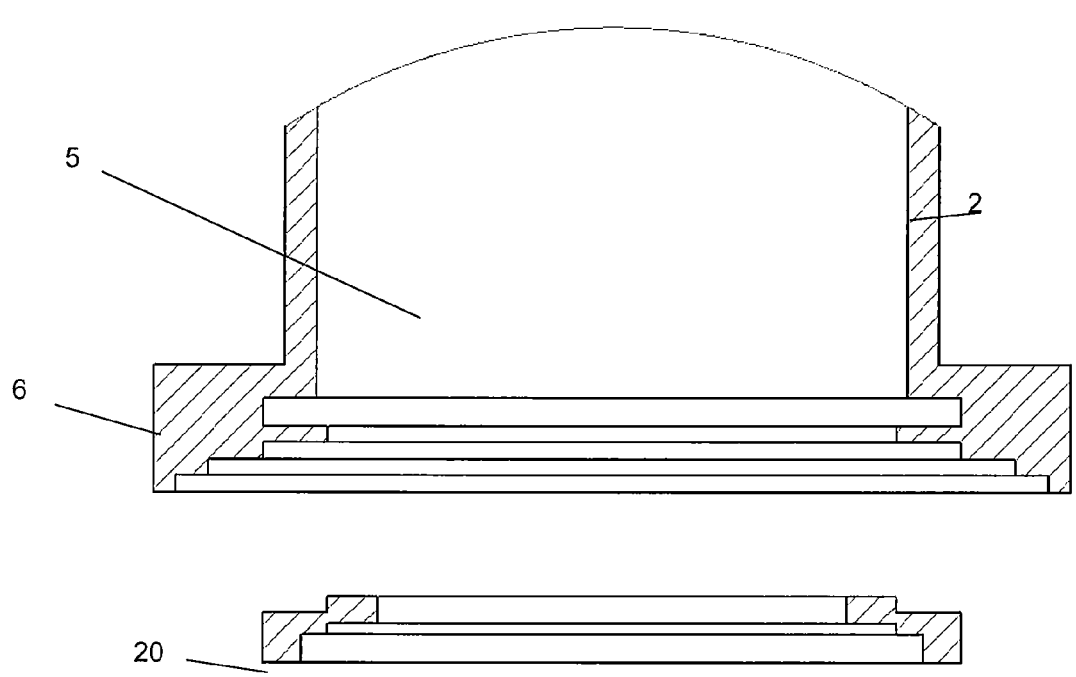
FIG. 7 Side view of the coupling adaptor of the dispenser.
Figure 8:
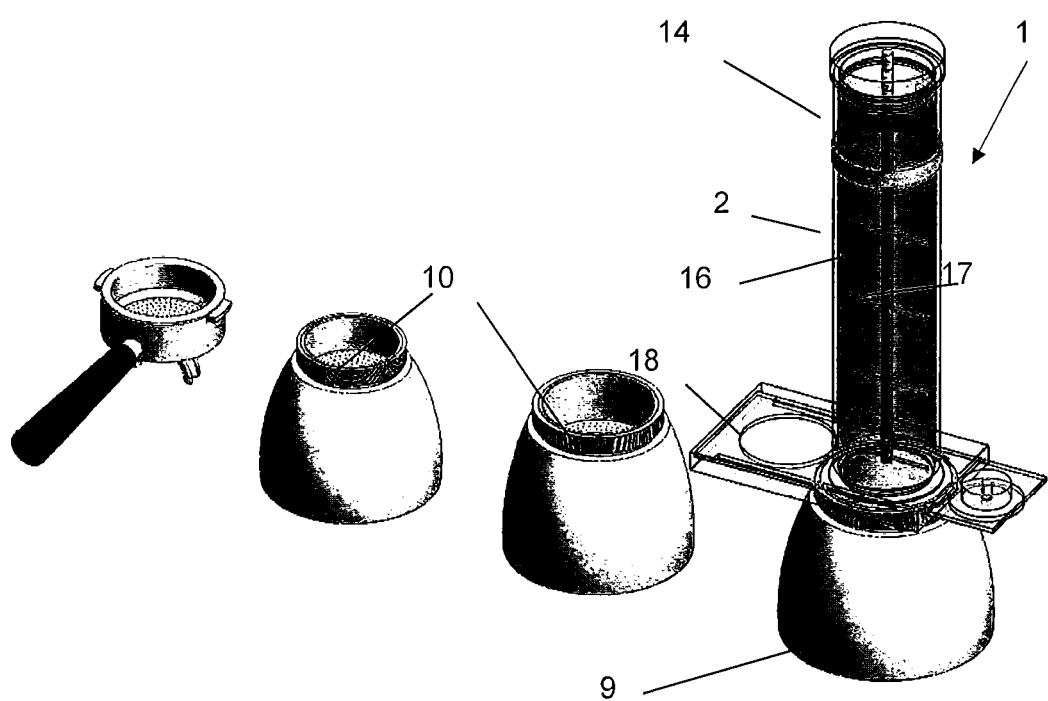
FIG. 8 General perspective view of the dispenser.

FIG. 7 illustrates a coupling adaptor (20) which is configured to engage with the coupling (8) to provide engagement for smaller Mokas, such as 1 or 2 cup sized Mokas. FIG. 8 illustrates another embodiment of the dispenser, particularly to illustrate that the dispenser may be used with a variety of different sized Mokas or even a portafiller as shown on the left hand side.

Figure 3B:
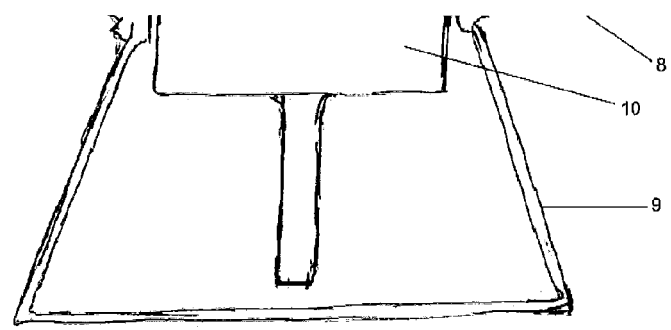

In an alternative embodiment as shown in FIG. 3B, the coupling (8) includes a silicone rubber ring configured to engage with differently sized lower containers (9) through frictional engagement. The rubber ring is soft enough so that as it compresses it covers the upper lip of the lower container (9). This means coffee only goes into the filter basket, not onto the lip which forms part of the pressure seal of the Moka pot.

Figure 5:
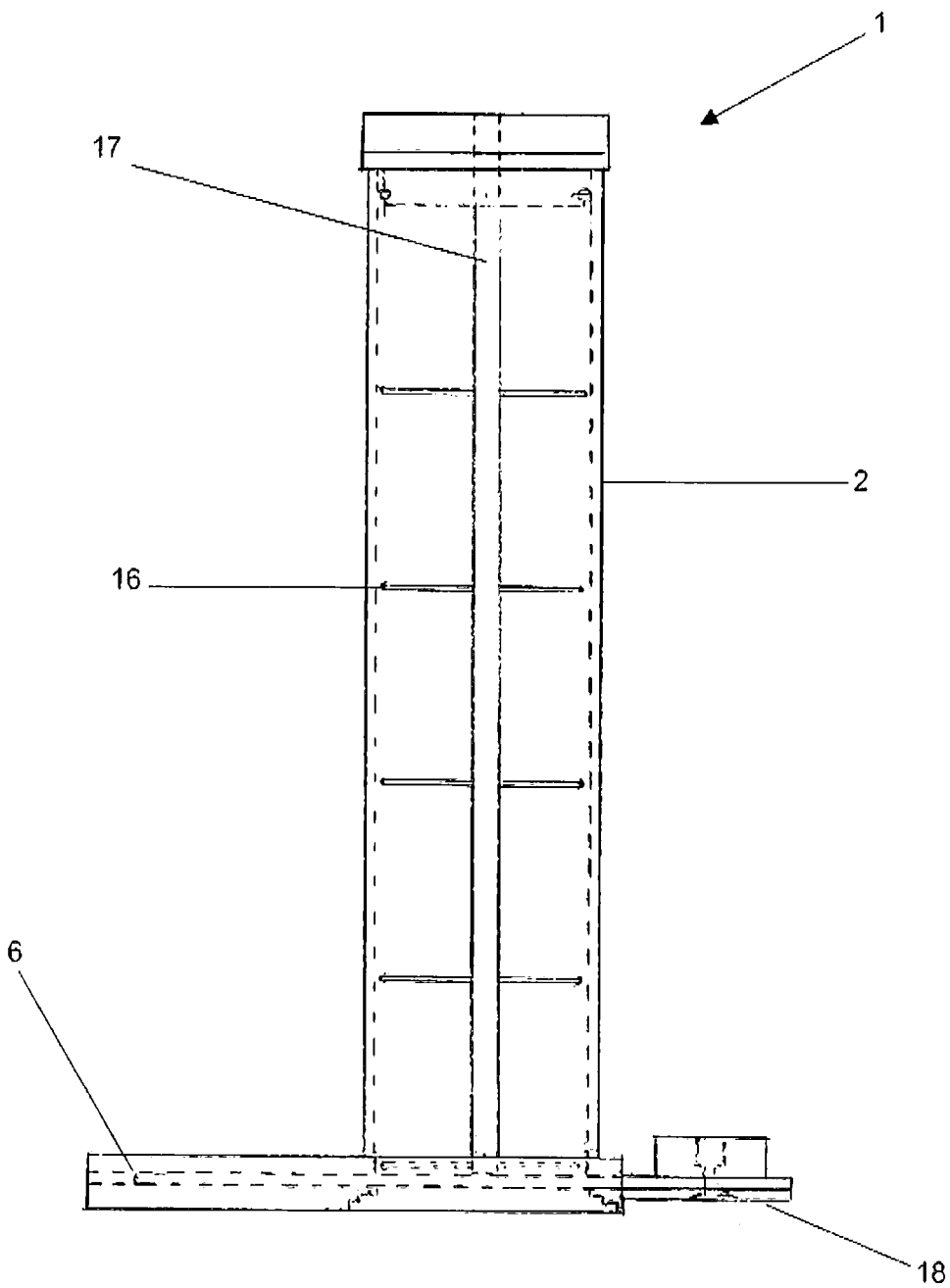
FIG. 5 Side view (detail in dotted outline) of the dispenser according to a further aspect of the present invention.
Figure 6:
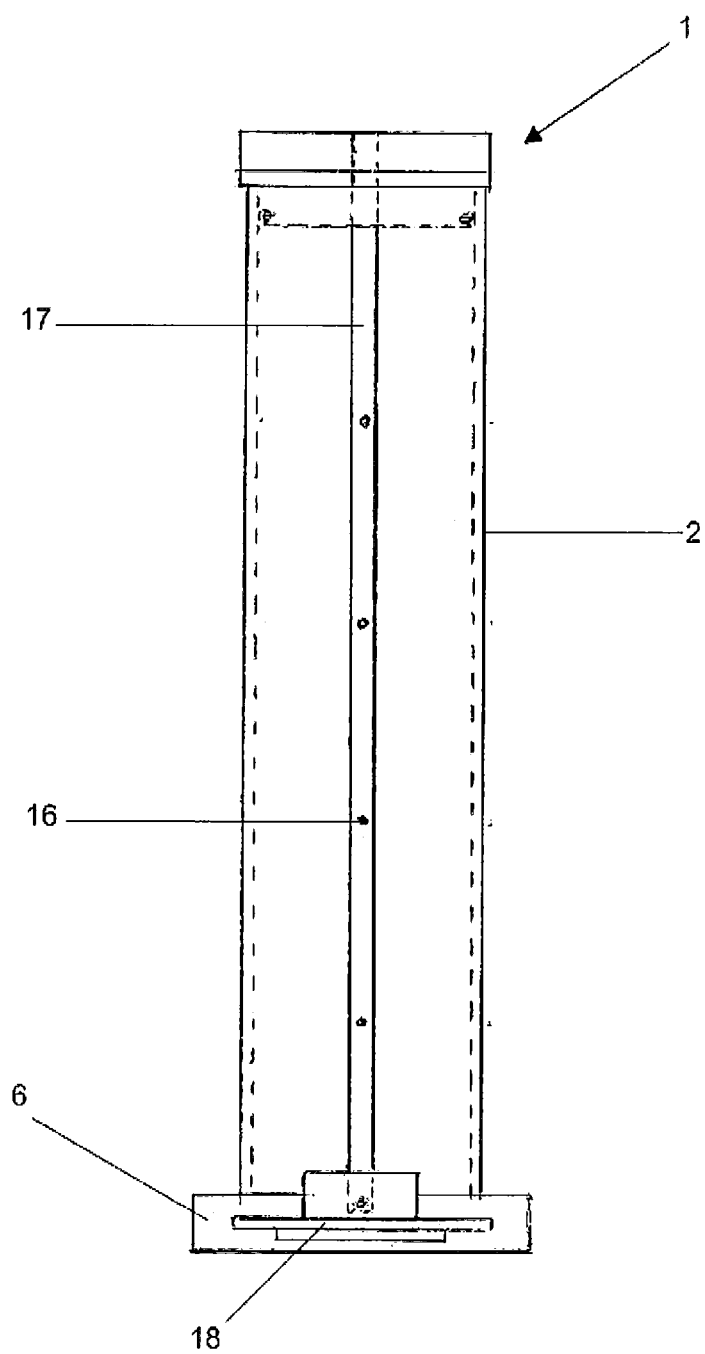
FIG. 6 End view of the dispenser according to a further aspect of the present invention (detail in dotted outlined).

As shown in FIGS. 1 and 2, the dispenser (1) includes a stirrer shown generally as (12). In FIGS. 2, 5 and 6, the stirrer (12) is housed within the hopper (2).

The stirrer (12) includes an upper knob (13) resides on top of the lid (14). The upper knob (13) allows the stirrer (12) to be moved in a substantially vertical and rotational manner within the hopper (2). The lid (14) includes a seal with an O-ring seal (15) which seals the top of the hopper (2) even when the upper knob (13) is moved in the vertical and rotational manner.

The stirrer (12) includes 10 spokes (16) that radiate out from a central shaft (17). The spokes (16) are provided in pairs separated by a distance of 5 cm along the central shaft (17). Each pair of spokes (16) radiates outwards from the central shaft (17) at substantially opposing directions. The length of each spoke (16) is configured to fit just within, but do not touch the inner walls of the hopper (2).

In use, ground coffee is added to the dispenser (1) through the open first end (4) with the aperture (7) on the slider (18) in the closed position. The stirrer (12) is then inserted into the hopper (2) and the lid (14) is engaged with the open first end (4) to seal the hopper (2).

At some point during preparation, a lower container (9) is filled with water, and the basket (10) then engaged within the lower container (9). The dispenser (1) is then connected via the coupling (8) on the lower container (9) with the filter basket (10) still in position. At this point, the aperture (7) on the slider (18) may be moved to the open position, although this could also be done after an initial stirring of the ground coffee within the hopper.

The stirrer (12) is then moved in a vertical and/or rotational manner within the hopper (2) through manipulation of the upper knob (13). This pushes the ground coffee into the basket (10) and gently and evenly tamps it.

Once the user is satisfied the basket (10) is evenly and sufficiently packed, the slider (18) is moved to the closed position. The dispenser (1) can then be removed from the lower container (9) and filter basket (10), and the upper container of the Moka pot can be engaged to the lower container (9) for use.

The dispenser (1) will often have remaining ground coffee in the hopper (2). The dispenser (1) can be stored with the coffee in the hopper (2) for later use, or it can be re-used straight away to dispense further coffee into another basket/lower container. The hopper typically has a volume able to retain most or all of a typical packet of coffee (dependent on overall size of hopper and amount of coffee in packet), so it conveniently acts as a storage container as well as a dispenser.

Aspects of the present invention have been described by way of example only and it should be appreciated that modifications and additions may be made thereto without departing from the scope thereof as defined in the appended claims.

What I claim is:

1. A dispenser for dispensing particulate matter, the dispenser including:
    a hopper;
    a coupling configured to allow attachment of the hopper, either directly or indirectly, to a receptacle;
    an aperture configured to be moved between an open and closed position to allow or prevent, respectively, flow of the particulate matter between the hopper and the receptacle;
    characterised in that the dispenser includes a stirrer housed in the hopper, and wherein the stirrer is configured to move in a substantially vertical and rotational manner within the hopper.

2. The dispenser of claim 1 wherein the particulate matter is ground coffee beans.

3. The dispenser of claim 1, wherein the hopper is a flask with an open first end.

4. The dispenser of claim 1, wherein the hopper has a substantially closed second end and houses the aperture.

5. The dispenser of claim 1, wherein the aperture is configured as part of a slider.

6. The dispenser of claim 5, wherein the dispenser includes a spacer which is located between the slider and receptacle.

7. The dispenser of claim 1, wherein the dispenser includes a base portion which in use is connected, or is able to be releasably connected to, to a bottom portion of the hopper.

8. The dispenser of claim 1, wherein the coupling is a concentric or conical ring coupling.

9. The dispenser of claim 1, wherein the dispenser includes a coupling adaptor.

10. The dispenser of claim 1 wherein the stirrer includes a plurality of spokes extending from at least one elongate shaft.

11. The dispenser of claim 10, wherein the plurality of spokes radiate out from the at least one elongate shaft at a length which is configured to fit within the confines of the hopper.

12. The dispenser of claim 10, wherein the plurality of spokes are configured to be a length whereby there is a gap of 1 mm or less between the ends of the spokes to the walls of the hopper.

13. The dispenser of claim 10, wherein the plurality of spokes are configured to engage with the walls of the hopper.

14. The dispenser of claim 10, wherein the plurality of spokes is provided in pairs, wherein each pair radiates substantially horizontally outwards from the at least one elongate shaft at substantially opposing directions.

15. The dispenser as claimed in claim 14, wherein each pair of spokes is separated from adjacent pairs of spokes by approximately 3-8 cm.

16. The dispenser in claim 1, wherein a pair of spokes is positioned at the very end of the shaft.

17. The dispenser in claim 10, wherein the stirrer has between 6 and 30 spokes radiating from the at least one elongate shaft.

18. A method of dispensing a particulate matter using the dispenser as defined in claim 1
    characterised in that the method includes the steps of
    a) adding an amount of particulate matter into the hopper;
    b) connecting the hopper and receptacle via the coupling;
    c) ensuring the aperture is in the open position; and
    d) moving the stirrer in the hopper in a substantially vertical and/or rotational manner within the hopper to aid transfer of the particulate matter from the hopper into the receptacle.

* * * * *